Nov. 24, 1936. A. T. LIGHT Re. 20,183

CONTINUOUS FREEZER

Original Filed June 9, 1926 3 Sheets-Sheet 1

Inventor

Albert T. Light

Attorneys

Nov. 24, 1936. A. T. LIGHT Re. 20,183
CONTINUOUS FREEZER
Original Filed June 9, 1926 3 Sheets-Sheet 2
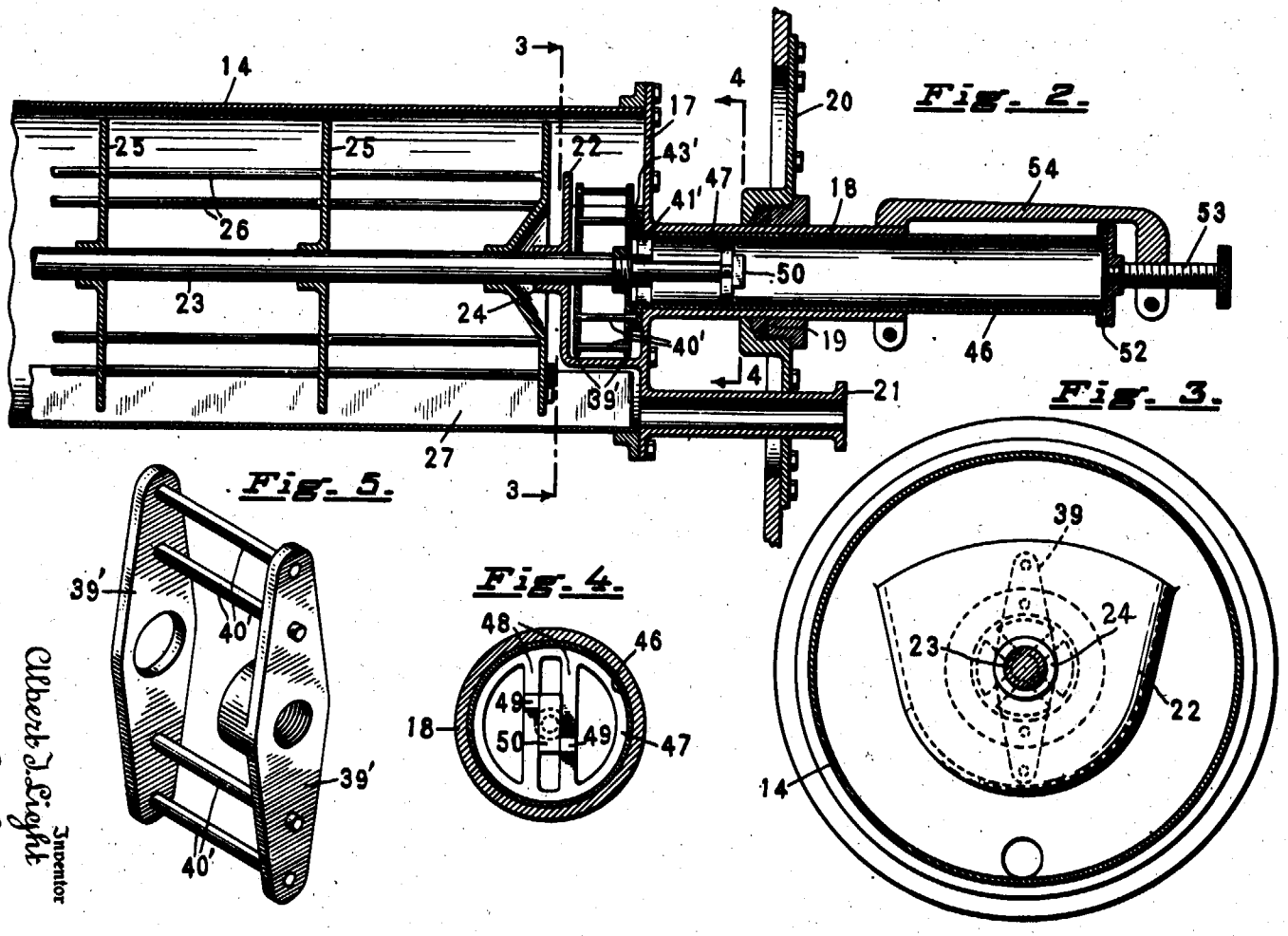
Inventor
Albert T. Light
Attorneys Nov. 24, 1936. A. T. LIGHT Re. 20,183
CONTINUOUS FREEZER
Original Filed June 9, 1926 3 Sheets-Sheet 3
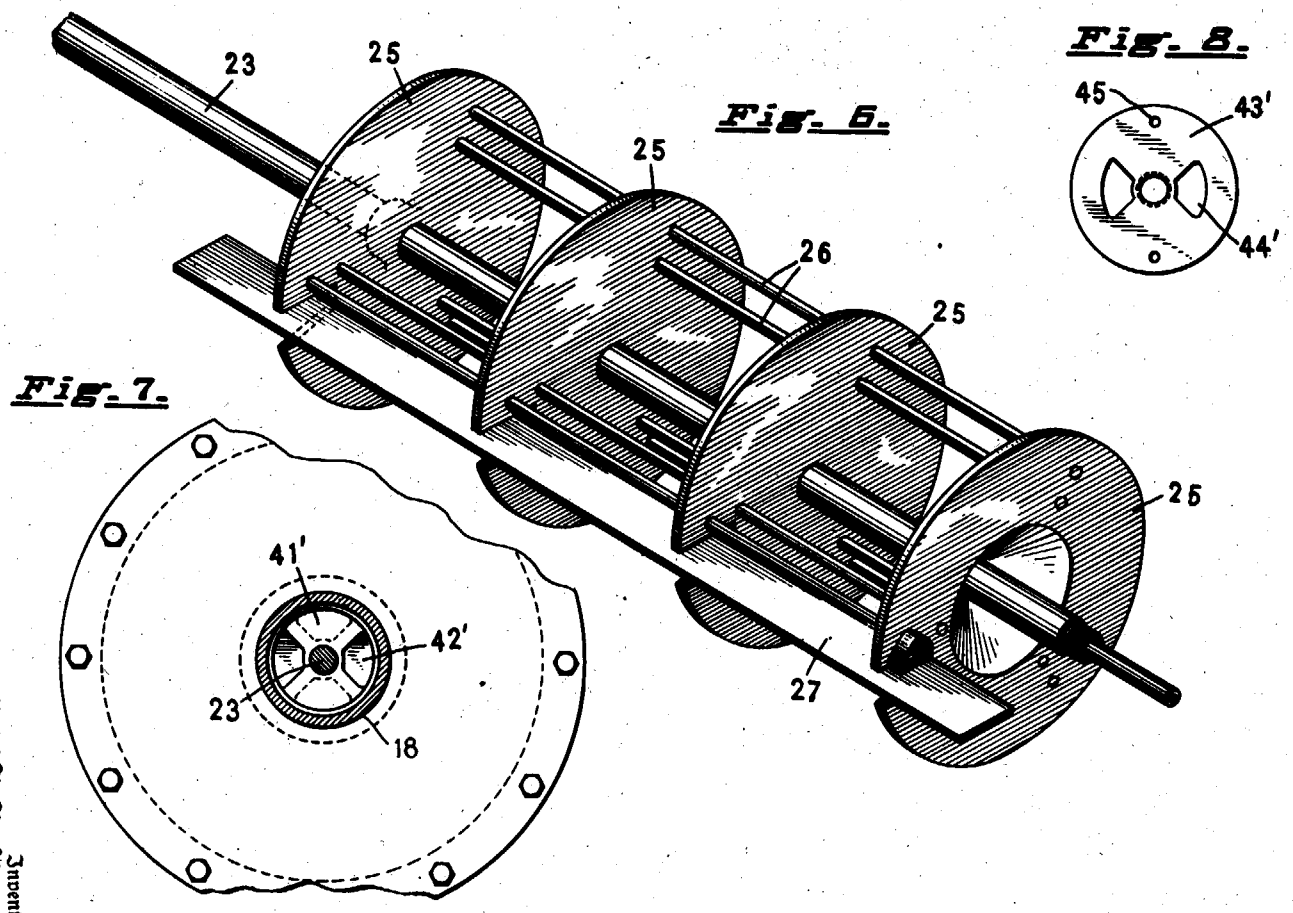
Inventor
Albert T. Light
Dodge and Sons
Attorneys Reissued Nov. 24, 1936 Re. 20,183

UNITED STATES PATENT OFFICE 20,183

CONTINUOUS FREEZER

Albert T. Light, Canton, Ohio, assignor to York Ice Machinery Corporation, York, Pa.

Original No. 1,773,912, dated August 26, 1930, Serial No. 114,672, June 9, 1926. Application for reissue August 20, 1932, Serial No. 629,733

18 Claims. (Cl. 62—114)

This invention relates to ice cream freezers and aims to provide a portable and self-contained freezer in which cream is continuously fed into a freezing cylinder and frozen cream is continuously discharged therefrom. The freezing cylinder is stationary and means is provided for circulating a freezing medium about the cylinder. A rotary shaft extends into the cylinder and carries a series of rotating discs which distribute the incoming cream around the chilled walls of the cylinder, from which it is removed by a scraper, beaten and thrown forward toward the next disc. The semi-frozen cream is finally deposited in a whipper cup in which a whipper carried by the shaft whips it up to a considerable overrun. A rotary disc valve regulates the discharge of cream from the cylinder. By making the cylinder stationary it is possible to attach a drain to the lower part of the freezing cylinder to facilitate sterilizing.

While I have disclosed a preferred embodiment for purposes of illustration it will be clear that various changes may be made in the structure without departing from the spirit and scope of the invention as hereinafter defined and claimed.

In the drawings;

Fig. 2 is an enlarged section through part of the discharge end of the freezer;

Fig. 3 is a section on line 3—3 of Fig. 2;

Fig. 4 is a section on line 4—4 of Fig. 2;

Fig. 5 is an enlarged perspective of the whipper element;

Fig. 6 is an enlarged perspective of the stirring element;

Fig. 7 is an enlarged end elevation of the discharge end of the cylinder;

Fig. 8 is an enlarged plan of the disc valve.

Figure 1:
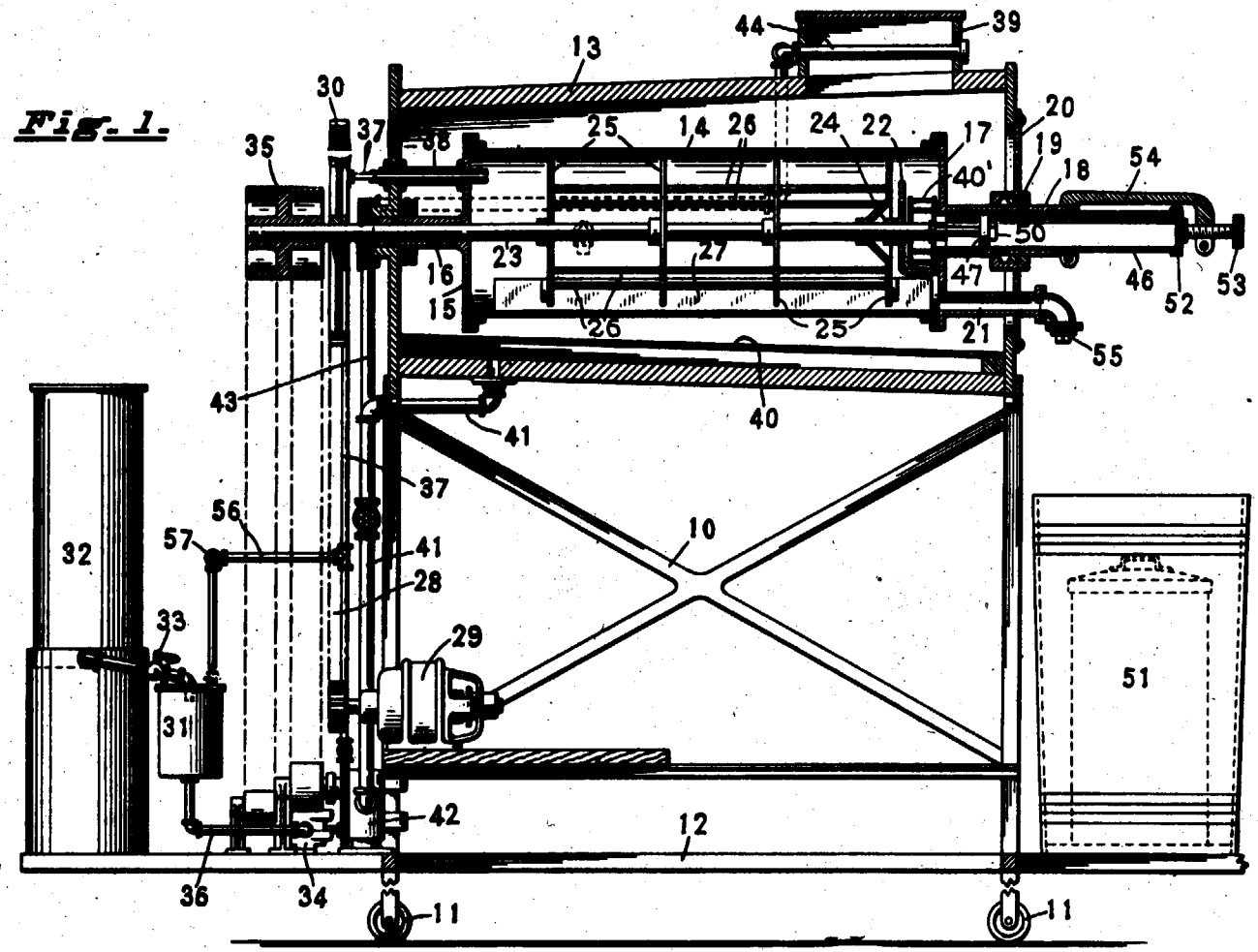
Fig. 1 is an elevation of the machine, partly in section.

Referring to the drawings more specifically, the frame 10, which is mounted on casters 11, carries a platform 12, and a tub 13. A stationary freezing cylinder 14 is mounted in the tub and has its receiving end closed by a plate 15 having a hollow stub 16 extending through one end of tub 13. The discharge end of the cylinder is closed by a plate 17 having a hollow tube 18 extending through a stuffing box 19 carried by the cover plate 20 secured to the front of the tub. Plate 17 carries a drain tube 21 extending from the bottom of the cylinder through cover plate 20, and is formed with a whipping cup 22 extending inwardly into the cylinder.

A shaft 23 is journaled in the stub 16 and extends through a hub 24 formed on the whipping cup. A series of discs 25 are secured to the shaft, and pairs of stirring rods 26 connect the discs, the discs being of a size to leave a space between their peripheries and the inside of the cylinder. A scraper 27 is also attached to the discs and is mounted to contact with the cylinder. The shaft 23 is rotated by a chain 28 connecting a motor 29 to a sprocket 30 keyed to the shaft.

Cream is supplied to the cylinder from an open-top can 31, which is fed from a cream reservoir 32 through a valve 33. The rotary cream pump 34, which is operated from pulley 35 keyed to shaft 23, draws cream from can 31 through pipe 36 and forces it through pipe 37 to nozzle 38, projecting into the upper part of the cylinder.

A hopper 39 is attached to the upper side of the tub for receiving ice and salt. When the machine is in operation the brine formed by the interaction of the ice and salt, after passing through strainer 40 extending across the tub near its bottom, passes down pipe 41 to the brine pump 42. This pump, which is operated from pulley 35, draws the brine down pipe 41 and forces it back through pipe 43 to the spray pipe 44 which distributes it in the upper part of the tub. This arrangement keeps the brine circulating through the tub and helps to maintain a uniform temperature around the cylinder 14.

As the cream issues from the nozzle 38 it is sprayed against the first of the revolving discs 25 which distributes it evenly around the chilled walls of the cylinder. It is then picked up by the scraper, beaten, and thrown forward, these actions being repeated until the frozen cream finally is tumbled into whipping cup 22. The cream is here whipped up to a considerable overrun and discharged in a manner now to be described.

The whipper shown in Fig. 5 rotates with shaft 23 inside the whipping cup, and is composed of two cross arms 39' connected by whipping rods 40'. A seat member 41' having oppositely disposed sector-shaped openings 42' is secured in the inner end of the hollow tube 18. A valve disc 43' having openings 44' corresponding to the openings in seat 41' is secured to the whipper by the projecting ends of two of the whipping rods 40' extending into holes 45 in the valve disc. In this manner the valve disc is caused to rotate with the whipper, alternately opening and closing the openings 42'. A discharge tube 46 fits rotatably within the hollow tube 18 and has a spider 47 secured therein. The spider is formed with two spaced arms 48 carrying studs 49 offset from the center. The parts are so designed that when the discharge tube 46 is in proper position the spider 47 abuts against the end of shaft 23. A drive bolt 50, which is threaded into the end of the shaft, is adapted to fit between the arms 48 as shown in Fig. 4. The elongated head of this bolt is then rotated in a clockwise direction until the bolt head engages with the lugs 49, thereby causing the discharge tube 46 to rotate with shaft 23. If desired the bolt can be left in disengaged position, thereby permitting the discharge tube to remain stationary.

It will be clear that as the shaft 23 rotates the disc valve 43' will intermittently open a passage from the whipping cup to the discharge tube, while the whipper rotates to whip up the cream and force it through the passage. Hence when the machine is in operation cream is being continuously fed into the cylinder through nozzle 38 and frozen cream is continuously being delivered through the discharge tube. This continuous discharge may be used to fill cones or other receptacles, and any of the discharge not so intercepted will fall into the waste can 51.

After the machine has been run continuously for some time it becomes desirable to disinfect the interior of the freezing cylinder. This can readily be accomplished by forcing live steam or hot water into the cylinder, the plug 55 being removable from the end of the drain pipe 21 to afford thorough drainage of the cylinder.

It will be noted that the cream supply line 37 has a lateral branch 56 leading back toward the supply can 31 and provided with a manual control valve 57. When valve 57 is closed the entire output of the supply pump is forced through nozzle 38 into cylinder 14 and the frozen cream must be allowed to issue from the discharge tube at a corresponding rate to prevent congestion in the freezing cylinder. To operate efficiently the machine should deliver ice cream from the discharge tube at the same rate it is being dispensed to customers. When the full discharge is not desired the valve 57 is partially opened, permitting part of the cream forced into line 37 by the pump, to escape back into the supply can 31. In this manner the regulation of valve 57 controls the amount of cream supplied to the cylinder 14 and as a result reduces the rate of discharge from the discharge tube.

A secondary means for temporary control of the discharge is supplied in the control cap 52, which is carried on a screw 53 passing through a yoke 54 attached to the tube 18.

What is claimed is,—

1. A continuous ice cream freezer comprising a tub, a stationary cylinder mounted in the tub, a rotatable shaft extending into the cylinder, discs mounted on the shaft and means at a point removed from the shaft for feeding cream against one of the discs.

2. A continuous ice cream freezer comprising a tub, a stationary cylinder mounted in the tub, a rotatable shaft extending into the cylinder, a disc mounted on the shaft, and a nozzle extending through the cylinder at a point removed from the shaft for feeding cream against the disc.

3. A continuous ice cream freezer comprising a tub, a stationary cylinder mounted in the tub, a rotatable shaft extending into the cylinder, discs mounted on the shaft and beater rods extending between the discs.

4. A continuous ice cream freezer comprising a tub, a stationary cylinder mounted in the tub, a rotatable shaft extending into the cylinder, discs mounted on the shaft, beater rods extending between the discs, and a scraper carried by the discs and projecting toward the inner wall of the cylinder.

5. A continuous ice cream freezer comprising a tub, a stationary cylinder mounted in the tub, a rotatable shaft extending into the cylinder, a whipping cup formed on one end of the cylinder and a whipper keyed to the shaft within the cup.

6. A continuous ice cream freezer comprising a stationary cylinder, a rotary shaft in the cylinder, beating means mounted on the shaft, means to feed cream to the cylinder, a discharge tube on the cylinder, an apertured valve seat mounted in the discharge tube, and a disc valve rotated by the shaft to alternately open and close the apertures in the valve seat.

7. A continuous ice cream freezer comprising a stationary cylinder, a rotary shaft in the cylinder, beating means mounted on the shaft, means to feed cream to the cylinder, a discharge tube on the cylinder, and means operable to cause the discharge tube to rotate with the shaft.

8. A continuous ice cream freezer comprising a tub, a stationary cylinder mounted in the tub, means for feeding cream into the cylinder, a tube extending from the cylinder through the tub to discharge frozen cream, and a drain tube extending from the lower part of the cylinder and passing through the tub.

9. In a portable continuous ice cream freezer, a framework carrying a tub, a freezing cylinder within the tub, a cream supply can mounted on the framework below the cylinder, a pump for elevating cream from said supply can to the cylinder, and a source of power mounted on the framework for operating the pump.

10. A continuous ice cream freezer comprising a freezing cylinder, a line for feeding cream to the cylinder, a branch line leading from the feed line, to permit the escape of part of the cream passing through the feed line, and a valve in the branch line to control the amount of cream escaping from the feed line.

11. A continuous ice cream freezer comprising a freezing cylinder, a pump for feeding cream to the cylinder, a feed line adapted for carrying the full capacity of the pump to the cylinder, and means for permitting a part of the cream to escape from the feed line before reaching the cylinder.

12. A continuous ice cream freezer comprising a freezing cylinder, a pump for feeding cream to the cylinder, a feed line adapted for carrying the full capacity of the pump to the cylinder, and means for permitting a controlled part of the cream to escape from the feed line before reaching the cylinder.

13. A machine for processing material, comprising a temperature-changing chamber through which the material to be processed is adapted to pass continuously, a whipping chamber associated with said temperature changing chamber into which the processed material is discharged, and means for whipping the material therein in order to thoroughly mix particles of different temperatures with each other.

14. In a continuous ice cream freezer, the combination of a cylindrical freezing chamber; means for refrigerating the cylindrical wall thereof; means for feeding cream to one end of said chamber; cream discharging means leading from substantially the center of the opposite end of said chamber; means for scraping the cylindrical wall of said chamber; means for constraining all the cream to pass at least once in a thin layer along a portion of the cylindrical wall of said chamber; and whipping means mounted within the freezing chamber in the path of cream flowing from the last named means to the cream discharging means.

15. In a continuous ice cream freezer, the combination of a cylindrical freezing chamber; means for refrigerating the cylindrical wall thereof; means for feeding cream to one end of said chamber; cream discharging means leading from substantially the center of the opposite end of said chamber; means for scraping the cylindrical wall of said chamber; means for constraining all the cream to pass at least once in a thin layer along a portion of the cylindrical wall of said chamber; a whipping cup communicating with the freezing chamber and with said cream discharging means, said cup being surrounded by a portion of the path of said scraping means; and a whipper in said whipping cup.

16. In a continuous ice cream freezer, the combination of a cylindrical freezing chamber; means for refrigerating substantially the entire cylindrical wall thereof; means for feeding cream to one end of said chamber; cream discharging means leading from substantially the center of the opposite end of said chamber; rotary scraping means coacting with substantially the entire cylindrical surface of said chamber; means turning with said scraping means, and constraining said cream to flow in a thin stream against the cylindrical wall of said chamber; and whipping means located between the last named means and said discharging means, and surrounded by a portion of the path of said scraping means.

17. The method of manufacturing frozen food products which comprises feeding a mix substantially continuously through successive stages of treatment, one stage being characterized by heat abstraction to at least a partially frozen condition, and a later stage being characterized by whipping in the presence of a gas under approximately uniform temperature conditions, whereby the frozen mix is aerated.

18. The method of manufacturing frozen food products, which comprises feeding a mix continuously through successive stages, in one of which stages the mix is at least partially frozen and is subjected to agitation under conditions which cause incorporation of part of the total desired quantity of air, and in a later one of which stages the mix leaving the first stage is subjected to whipping without substantial further reduction of temperature whereby the remainder of the desired gas content is incorporated.

ALBERT T. LIGHT.